United States Patent
Papillon et al.

(10) Patent No.: US 10,747,906 B2
(45) Date of Patent: Aug. 18, 2020

(54) ENSURING USB ATTACK PROTECTION

(71) Applicant: Alcatel Lucent, Nozay (FR)

(72) Inventors: Serge Papillon, Nozay (FR); Haithem El Abed, Nozay (FR)

(73) Assignee: Alcatel Lucent, Nozay (FR)

( * ) Notice: Subject to any disclaimer, the term of this patent is extended or adjusted under 35 U.S.C. 154(b) by 247 days.

(21) Appl. No.: 16/060,134

(22) PCT Filed: Nov. 18, 2016

(86) PCT No.: PCT/EP2016/078193
§ 371 (c)(1),
(2) Date: Jun. 7, 2018

(87) PCT Pub. No.: WO2017/097563
PCT Pub. Date: Jun. 15, 2017

(65) Prior Publication Data
US 2018/0373897 A1 Dec. 27, 2018

(30) Foreign Application Priority Data
Dec. 10, 2015 (EP) ...................................... 15306976

(51) Int. Cl.
*G06F 21/00* (2013.01)
*G06F 21/73* (2013.01)
(Continued)

(52) U.S. Cl.
CPC .............. *G06F 21/73* (2013.01); *G06F 21/31* (2013.01); *G06F 21/445* (2013.01); *G06F 21/85* (2013.01)

(58) Field of Classification Search
CPC ........ G06F 21/31; G06F 21/445; G06F 21/73; G06F 21/85; H04L 63/108
See application file for complete search history.

(56) References Cited

U.S. PATENT DOCUMENTS

| 8,984,580 B2 * | 3/2015 | Bunger | G06F 3/038 726/1 |
| 2004/0003262 A1 * | 1/2004 | England | G06F 21/606 713/189 |

(Continued)

FOREIGN PATENT DOCUMENTS

| CN | 101561751 A | 10/2009 |
| JP | 2001273059 A | 10/2001 |

(Continued)

OTHER PUBLICATIONS

English Bibliography of Chinese Patent No. CN101561751A, Published on Oct. 21, 2009, Printed from Derwent Innovation on Jun. 13, 2019, 4 pages.

(Continued)

*Primary Examiner* — J. Brant Murphy
*Assistant Examiner* — Ka Shan Choy
(74) *Attorney, Agent, or Firm* — Fay Sharpe LLP

(57) ABSTRACT

For ensuring a universal serial bus, USB, attack protection between a communication device (CD) and an accessory device (AD), a protection device (PD) being inserted between the communication device (CD) and the accessory device (AD) through a USB link, the communication device (CD): memorizes the highest value (HV) of indexes of string descriptor found in a USB Device Descriptor received from the accessory device (AD), sends a request (Req) for a string descriptor to the accessory device (AD) with a value (Val1) of index higher than said highest value (HV), receives a response (Res) generated and sent from the protection device (PD), the response containing an identifier (Id P) of the protection device validates the presence of the protection device (PD) if the identifier (Id P) is found in a database.

12 Claims, 2 Drawing Sheets

Figure 1:
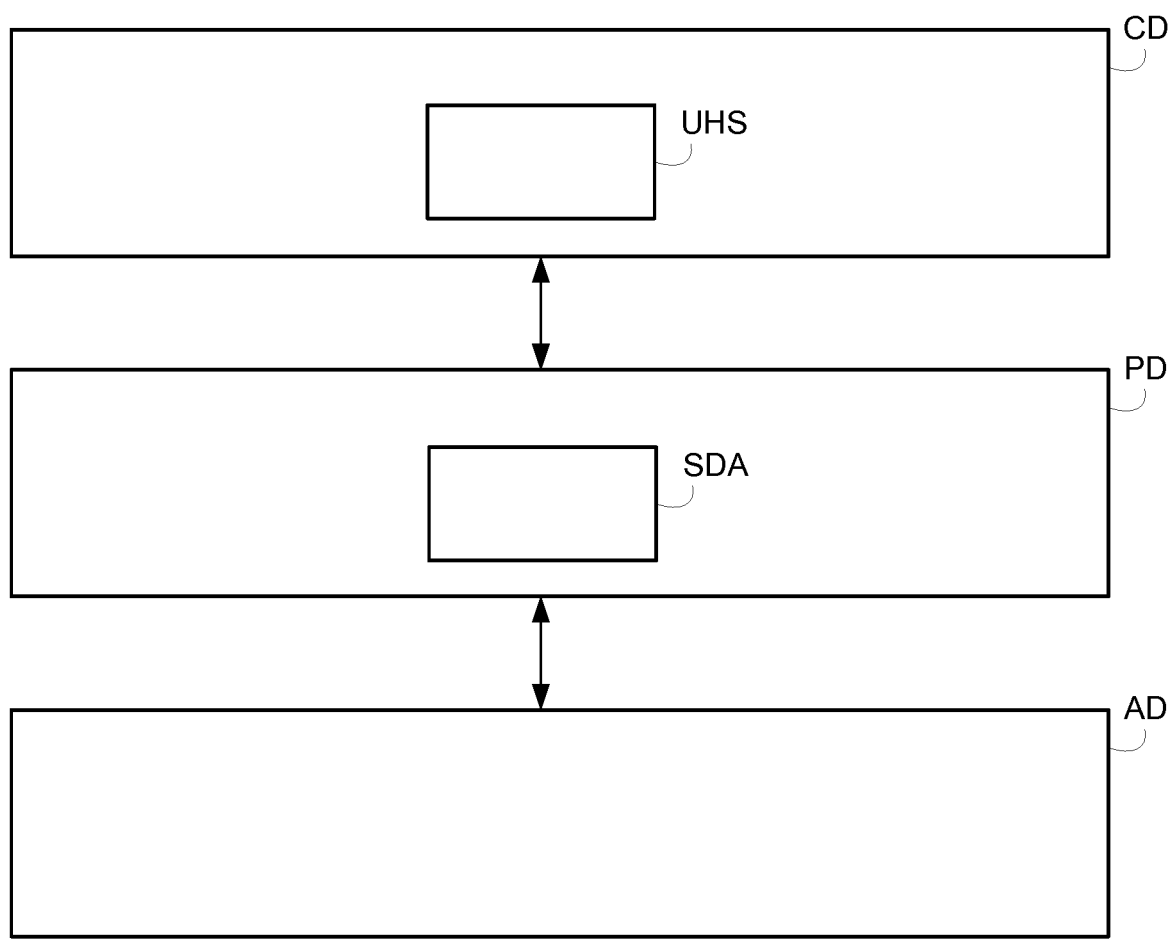

(51) Int. Cl.
  *G06F 21/44* (2013.01)
  *G06F 21/85* (2013.01)
  *G06F 21/31* (2013.01)

(56) References Cited

U.S. PATENT DOCUMENTS

| | | | |
|---|---|---|---|
| 2009/0248904 A1* | 10/2009 | Takamoto | G06F 13/4045 710/8 |
| 2012/0311207 A1 | 12/2012 | Powers et al. | |
| 2013/0014221 A1 | 1/2013 | Moore et al. | |
| 2013/0167254 A1 | 6/2013 | Gyllenskog | |

FOREIGN PATENT DOCUMENTS

| JP | 2009230685 A | 10/2009 |
|---|---|---|
| JP | 2009245020 A | 10/2009 |
| JP | 2014509421 A | 4/2014 |

OTHER PUBLICATIONS

English Bibliography of Japanese Patent No. JP2001273059A, Published on Oct. 5, 2001, Printed from Derwent Innovation on Jun. 13, 2019, 5 pages.
English Bibliography of Japanese Patent No. JP2009230685A, Published on Oct. 8, 2009, Printed from Derwent Innovation on Jun. 13, 2019, 5 pages.
English Bibliography of Japanese Patent No. JP2009245020A, Published on Oct. 22, 2009, Printed from Derwent Innovation on Jun. 13, 2019, 4 pages.
English Bibliography of Japanese Patent No. JP2014509421A, Published on Apr. 17, 2014, Printed from Derwent Innovation on Jun. 13, 2019, 4 pages.
European Patent Applicatin No. 15306976.0-1870, Extended European Search Report, dated Mar. 17, 2016, 4 pages.
PCT Patent Application No. PCT/EP2016/078193, Written Opinion of the International Searching Authority, dated Jan. 30, 2017, 5 pages.
International Search Report for PCT/EP2016/078193 dated Jan. 30, 2017.

* cited by examiner

ENSURING USB ATTACK PROTECTION

FIELD OF THE INVENTION

The present invention pertains to communication devices and, more particularly, to communication devices, such as media players, that receive accessory devices, such as USB devices.

BACKGROUND

Modern communication devices, such as computers, allow computer memory expansion by providing a universal serial bus (USB) receptacle. USB peripheral devices usually have a plug with physical and electronic specifications, just as communication devices capable of receiving a USB plug have a receptacle with physical and electronic specifications.

USB devices can be of different natures, like a storage device (flash drive), a computer mouse, a computer keyboard, a printer, or a webcam.

Specifically, USB storage devices are small, inexpensive, and highly portable, and are ubiquitous in modern computing devices. Due to its portable nature, a single USB storage device is often being plugged into a number of different hosting communication devices. For example, a consumer can store his or her personal music collection on a USB storage device and then play that music on a computer, a smart phone, or even an automobile stereo system.

The highly portability characteristic of USB storage devices make them a popular target as of computer viruses.

Recently, serious attack dubbed BadUSB has been unveiled. It involves malicious USB devices attacking a victim host in an instance and a malicious host reprogramming a victim USB device in another instance. The combination of both attacks paves the way to a physical propagation of computer malware, one that is able to reach air-gapped systems (systems that are isolated from any outside networks). In this kind of attack, a custom built USB device can act maliciously through keyboard emulation in order to attack a USB host. A normal USB device (USB storage stick for example) can be reprogrammed at the micro-controller level by a malicious host, thus creating a malicious USB device capable of attacking other USB hosts that it gets inserted into. This is done at the controller level (firmware) of the USB device and not at the file system level that can be formatted or scanned by an anti-virus.

There exist some techniques that enable communication devices to control the nature of USB device connected to the communication devices.

But there is a need for proof to the USB host whether the USB device is filtered or not by such techniques.

SUMMARY

This summary is provided to introduce concepts related to the present inventive subject matter. This summary is not intended to identify essential features of the claimed subject matter nor is it intended for use in determining or limiting the scope of the claimed subject matter.

In accordance with one embodiment, a method is provided for ensuring a universal serial bus, USB, attack protection between a communication device and an accessory device, a protection device being inserted between the communication device and the accessory device through a USB link, the method comprising the following steps in the communication device:

memorizing the highest value of indexes of string descriptor found in a USB Device Descriptor received from the accessory device, sending a request for a string descriptor to the accessory device with a value of index higher than said highest value, receiving a response generated and sent from the protection device (PD), the response containing an identifier of the protection device validating the presence of the protection device if the identifier is found in a database.

Advantageously, the invention offers an enterprise grade solution to provide a proof to a host USB at USB initialization time that a USB device is filtered by a known (by the host) hardware USB filtering solution. The way to perform the proof is fully compatible with the USB protocol.

In an embodiment, the protection device intercepts the request and does not transfer this latter to the accessory device.

In an embodiment, said value is the next integer superior to said highest value.

In an embodiment, the communication device sends a challenge to the protection device under the form of a request for another string descriptor with another value of index higher than said highest value and different from said value, and authenticates the protection device if the response to the challenge is valid, by means of a cryptographic function or a onetime password.

In an embodiment, said another value is the next integer superior to said value.

In an embodiment, the communication device and the protection device share a symmetric or asymmetric cryptographic key or share a secret that is composed of a sequence of passwords or numbers and a counter.

In an embodiment, the protection device is dedicated to one or several type of accessory devices, allowing only said one or several type of accessory devices to communicate with the communication device.

The invention relates also to a method for ensuring a universal serial bus, USB, attack protection between a communication device and an accessory device, a protection device being inserted between the communication device and the accessory device through a USB link, the method comprising the following steps in the protection device:

memorizing the highest value of indexes of string descriptor found in a USB Device Descriptor received from the accessory device, receiving a request for a string descriptor with a value of index higher than said highest value, the request being sent from the communication device, generating and sending a response to the communication device, the response containing an identifier of the protection device, the identifier being used by the communication device for validating the presence of the protection device if the identifier is found in a database.

The invention relates also to a communication device for ensuring a universal serial bus, USB, attack protection between a communication device and an accessory device, a protection device being inserted between the communication device and the accessory device through a USB link, the communication device comprising:

means for memorizing the highest value of indexes of string descriptor found in a USB Device Descriptor received from the accessory device, means for sending a request for a string descriptor to the accessory device with a value of index higher than said highest value, means for receiving a response generated and sent from the protection device, the response containing an identifier of the protection device, means for validating the presence of the protection device if the identifier is found in a database.

The invention relates also to a protection device for ensuring a universal serial bus, USB, attack protection between a communication device and an accessory device, the protection device being inserted between the communication device and the accessory device through a USB link and comprising:

means for memorizing the highest value of indexes of string descriptor found in a USB Device Descriptor received from the accessory device, means for receiving a request for a string descriptor with a value of index higher than said highest value, the request being sent from the communication device, means for generating and sending a response to the communication device, the response containing an identifier of the protection device, the identifier being used by the communication device for validating the presence of the protection device if the identifier is found in a database.

The invention also pertains to a computer program capable of being implemented within a device, said program comprising instructions which, when the program is executed within said device, carry out steps according to the inventive method.

Figure 2:
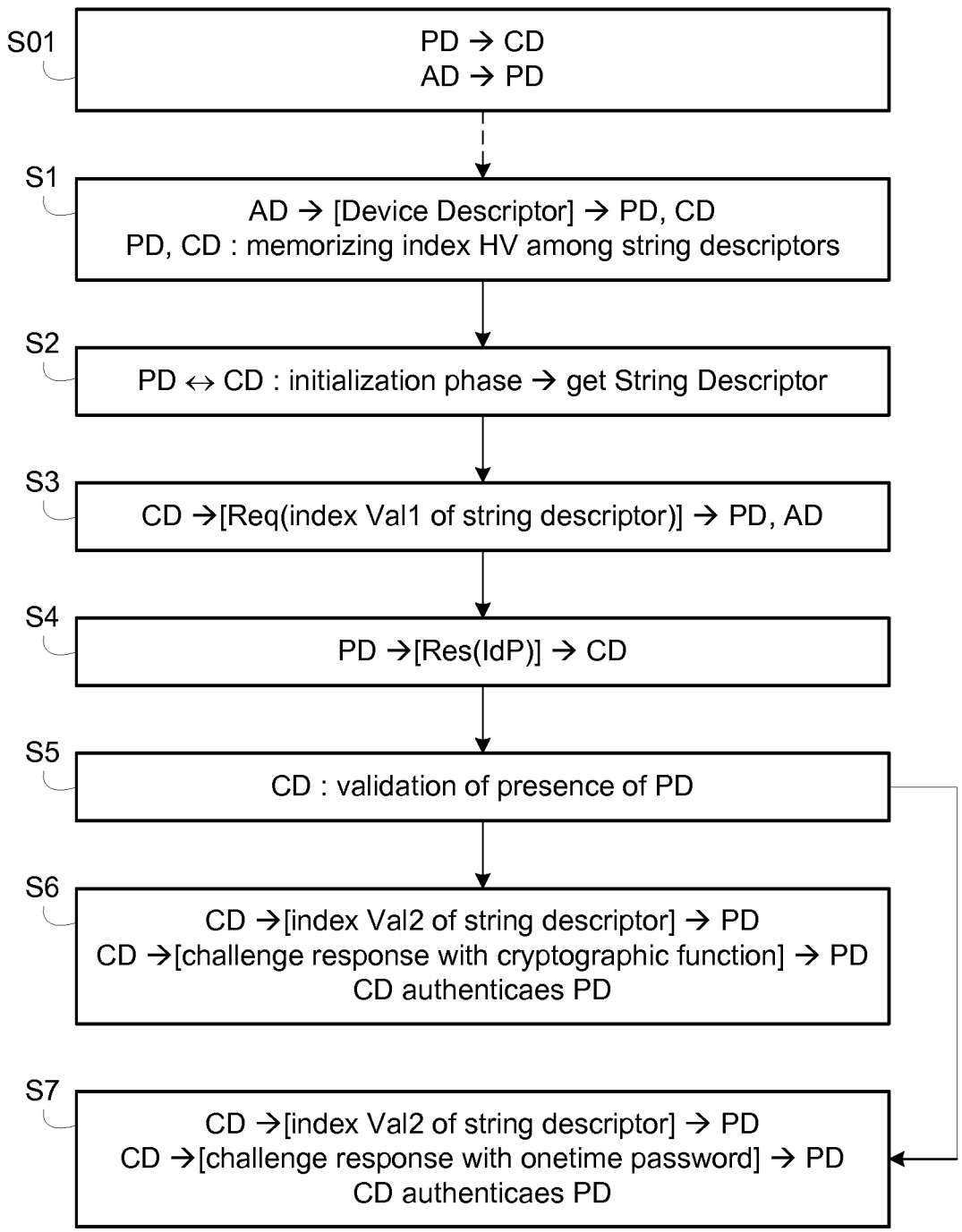

The present invention and the benefits thereof shall be better understood upon examining the description below, which makes reference to the attached figures, in which:

FIG. 1 is a schematic block diagram of a communication system according to one embodiment of the invention for ensuring USB attack protection; and FIG. 2 is an algorithm of a method for ensuring USB attack protection according to one embodiment of the invention.

With reference to FIG. 1, a communication system according to the invention comprises a communication device CD, a protection device PD and an accessory device AD.

The communication device CD is capable of connecting directly with the accessory device AD via an USB link in order to access to the content stored in the accessory device. The communication device can be referred to as a host device receiving via a plug the accessory device AD.

The communication device CD can be a personal computer or a laptop, a tablet, a smart phone, a personal digital assistant, a set-top box, a residential gateway, a game console or a connected television, for instance. More generally it concerns any type of electronic equipment comprising a communication module, capable of establishing connection with the accessory device AD via a USB link to exchange data such as messages with the accessory device.

The communication device CD has one or more USB receptacles wherein various USB accessory devices can be physically plugged.

The communication device CD comprises a USB host stack UHS that is a software module managing USB device drivers in an operating system. The USB host stack UHS implements the USB protocol, installs and loads appropriate drivers for different USB devices. The USB host stack UHS acts as a security agent and is a process agent responsible for mutual authentication with the protection device PD, using a stored certificate (or a pre shared key) signed by an enterprise authority.

The accessory device AD is a USB device including a USB plug physically and mechanically compatible with the USB receptacle of the communication device wherein the USB plug can be plugged into the USB receptacle to achieve physical and electrical connectivity.

In one example, the accessory device AD is a thumb drive or a hard drive as storage device.

In another example, the accessory device AD is a personal computer, a laptop, a tablet or a smart phone.

In another example, the accessory device AD is a connected object such as an advertisement board, a television set, a household appliance, a communication terminal, a fridge, a camera. A connected object comprises a communication interface that is part of a data processing unit that may be directly embedded in the connected object.

The accessory device AD contains a process typically a firmware running on a microcontroller implementing the USB protocol and higher functions of the accessory device AD.

The protection device PD also includes a USB plug physically and mechanically compatible with the USB receptacle of the communication device CD, and a USB receptacle physically and mechanically compatible with the USB plug of the accessory device AD. Thus the protection device PD can be physically and electrically connected with the communication device CD and the accessory device AD. The protection device PD allows the communication device CD and the accessory device AD to be electrically connected therethrough.

The protection device PD comprises a shield device agent SDA that is a process agent responsible for mutual authentication with the communication device CD. The shield device agent SDA is also responsible for the loading of a shield policy, the creation of the secure identifier, and the notification of attack attempts. The shield device agent SDA is loaded with a certificate signed by an enterprise authority (alternatively an enterprise pre shared key could be used instead of the certificate), as well as the public key associated with the certificate.

The shield device agent SDA plays also the role of surrogate of the accessory device AD, and is responsible for filtering messages between the communication device and the accessory device. The shield device agent SDA implements a database that contains security rules, containing for example a match (of a message) and an action (drop, patch etc).

The shield device agent SDA is able to analyze the content of a Device Descriptor and to create a custom Device Descriptor. A Device Descriptor contains the following fields respectively associated with the following descriptions:

Field: bLength
  Description: Specifies the length, in bytes, of this descriptor.
Field: bDescriptorType
  Description: Specifies the descriptor type.
Field: bcdUSB
  Description: Identifies the version of the USB specification that this descriptor structure complies with. This value is a binary-coded decimal number.
Field: bDeviceClass
  Description: Specifies the class code of the device as assigned by the USB specification group.
Field: bDeviceSubClass
  Description: Specifies the subclass code of the device as assigned by the USB specification group.
Field: bDeviceProtocol
  Description: Specifies the protocol code of the device as assigned by the USB specification group.

Field: bMaxPacketSize0
  Description: Specifies the maximum packet size, in bytes, for endpoint zero of the device. The value must be set to 8, 16, 32, or 64.
Field: idVendor Description: Specifies the vendor identifier for the device as assigned by the USB specification committee.
Field: idProduct
  Description: Specifies the product identifier. This value is assigned by the manufacturer and is device-specific.
Field: bcdDevice
  Description: Identifies the version of the device. This value is a binary-coded decimal number.
Field: iManufacturer
  Description: Specifies a device-defined index of the string descriptor that provides a string containing the name of the manufacturer of this device.
Field: iProduct
  Description: Specifies a device-defined index of the string descriptor that provides a string that contains a description of the device.
Field: iSerialNumber
  Description: Specifies a device-defined index of the string descriptor that provides a string that contains a manufacturer-determined serial number for the device.
Field: bNumConfigurations
  Description: Specifies the total number of possible configurations for the device.

The shield device agent SDA is dedicated to filter one or several type of USB accessory devices. For example, the shield device agent SDA is dedicated to operate with USB storage devices and will not allow any other type of USB accessory device to communicate with the communication device CD. To that end for example, the shield device agent SDA consults security rules in the database with a Device Descriptor retrieved from the USB accessory device. More especially, the shield device agent SDA checks if the value of the field "bDeviceClass", assumed to be associated with the type of device, is included in a list of authorized devices.

With reference to FIG. 2, a method for ensuring a USB attack protection according to one embodiment of the invention comprises steps S1 to S7 executed within the communication system.

In an initial step S01, a user wants to use the accessory device AD with the communication device CD and starts by inserting the protection device PD into the communication device CD.

The protection device PD registers with the communication device CD. Upon control request from the communication device, the shield device agent SDA sends a message to the USB host stack UHS, the message containing a Device Descriptor that includes information about the protection device PD, its configurations, interfaces and the related endpoints.

The registration establishes a bidirectional communication link between the protection device PD and the communication device CD.

The accessory device AD is plugged into the protection device PD. Thus the protection device PD is inserted between the accessory device AD and the communication device CD.

In step S1, the accessory device AD and the communication device CD are in an initialization phase during which the USB host stack UHS queries the accessory device AD for the Device Descriptor, the Configuration Descriptor, and, depending on both descriptors a given number of String Descriptors.

During this initialization phase, at least one message containing the Device Descriptor is sent from the accessory device AD in response to an initial request from the communication device CD to get the Device Descriptor. For example, the initial request is of type "Get Device Descriptor". The request and the response are sent through the protection device PD that can analyze the content of the request and the response.

In particular, the protection device PD and the communication device CD extract and memorize the highest value HV of indexes found between the three string descriptor indexes in the Device Descriptor.

In step S2, the initialization phase then continues with the generic behavior, up to the point where the communication device CD requests the string descriptors themselves from the accessory device AD. For example, the requests are of type "Get String Descriptor". Depending of their presence, it could be asked for just one (the default one, at index 0, is a mandatory language capability), or up to for four (if every indexes are different from 0 in the Device Descriptor).

In step S3, the USB host stack UHS sends a request Req for another string descriptor to the accessory device AD with a primary value Val1 of index higher than said highest value. For example, the primary value Val1 is the next integer superior to said highest value:

Val1=HV+1.

If the USB host stack UHS was communicating with an accessory device directly, i.e. without protection device, the accessory device would return an error, as there exist no string descriptor with an index with this value.

As the USB host stack UHS is communicating with the accessory device through a protection device, the protection device that had memorized the highest value HV of indexes knows that the request with a value Val of index higher than said highest value shouldn't be transferred to the accessory device but is a specific request from the communication device to get identification of the protection device.

In step S4, the protection device intercepts the request Req and does not transfer this latter to the accessory device. The protection device creates a custom String Descriptor as response with an identifier IdP of the protection device as a string payload. The protection device sends a response Res to communication device, the response containing in particular the identifier IdP of the protection device.

In step S5, the communication device CD knows that it is not communicating directly with an accessory device, but surely with a protection device. The USB host stack UHS validates the presence of the protection device if the identifier IdP is found in a database (either local to the computer, or distant).

The following alternative steps S6 and S7 brings additional security against replay attack, in case an attacker finds a way to learn some of the identifiers of the protection devices of a company, the attacker being able to craft special USB device to answer to the string descriptor request (with said value Val) with a valid identifier of protection device.

In step S6, the USB host stack UHS sends a cryptographic nonce (a pseudo random number) to the shield device agent SDA. The USB host stack UHS performs a cryptographic function on the nonce, like an encryption of the nonce and sends the result to the USB host stack UHS.

The USB host stack UHS performs a corresponding cryptographic function on the received result (like a decryption) and checks if the results are equal or coherent, meaning that the protection device is really what it seems.

The USB host stack UHS and the shield device agent SDA can share a secret that can be a symmetric cryptographic key, or can use an asymmetric cryptographic key with a public/private key pair, the private key being stored in the shield device agent SDA, and the public key being known by the USB host stack UHS (and associated with the identifier of the protection device.

To that end, the USB host stack UHS sends a request to the shield device agent SDA with a non conventional size, the request being for another string descriptor with a secondary value Val2 of index higher than said highest value and different from said primary value Val1.

For example, the secondary value Val2 is the next integer superior to said value: Val2=Val1+1.

The size of the request would be enhanced to take the size of the nonce into account. It is not a problem to use an unconventional USB packet at this time of the sequence as it is already established the fact that the communication device is connected to a protection device and not directly to a classic USB device. The protection device is dedicated to treat this second special USB string descriptor request, and is able manage the unusual size of the packet. The response to the request is be sent by shield device agent SDA as a string payload.

In step S7, the USB host stack UHS sends a request to the shield device agent SDA with a non conventional size, the request being for another string descriptor with a secondary value Val2 of index higher than said highest value and different from said primary value Val1.

The USB host stack UHS and the shield device agent SDA can share a secret that is composed of a sequence of passwords or numbers and a counter. The sequence can be stored on both side or can be generated by a shared function (each protection device has its own particular function, so that different protection devices generate different sequences).

The shield device agent SDA sends back a response containing the good number in its sequence as a string payload. The USB host stack UHS just performs a look up in the sequence for this corresponding protection device and checks if the received number is valid to authenticate the protection device.

In each step S6 and S7, the USB host stack UHS sends a challenge to the shield device agent SDA with a non conventional size, under the form of a request for another string descriptor with a secondary value Val2 of index higher than said highest value and different from said primary value Val1, and authenticates the protection device if the response to the challenge is valid, by means of a cryptographic function or a onetime password.

Finally, once the protection device has been authenticated, the communication device can resume the generic initialization phase. If the presence and/or the authentication of the protection device is not successful, the communication device can take whichever measure the enterprise policy managers decided.

The invention described here relates to a method and a device for ensuring a USB attack protection. According to one implementation of the invention, the steps of the invention are determined by the instructions of a computer program incorporated into the device, such as the protection device PD. The program comprises program instructions which, when said program is loaded and executed within the device, carry out the steps of the inventive method.

Consequently, the invention also applies to a computer program, particularly a computer program on or within an information medium, suitable to implement the invention.

This program may use any programming language, and be in the form of source code, object code, or intermediate code between source code and object code, such as in a partially compiled form, or in any other form desirable for implementing the inventive method.

The invention claimed is:

1. A method for ensuring a universal serial bus, USB, attack protection between a communication device and an accessory device, a protection device being inserted between the communication device and the accessory device through a USB link, the method comprising the following steps in the communication device:
    memorizing a highest value of indexes of string descriptor found in a USB Device Descriptor received from the accessory device,
    sending a request for a string descriptor to the accessory device with a value of index higher than said highest value,
    receiving a response generated and sent from the protection device, the response containing an identifier of the protection device, and
    validating a presence of the protection device in response to the identifier being found in a database.

2. A method according to claim 1, whereby the protection device intercepts the request from the communication device and does not transfer the request to the accessory device.

3. A method according to claim 1, whereby said value is the next integer superior to said highest value.

4. A method according to claim 1, whereby the communication device sends a challenge to the protection device under the form of a request for another string descriptor with another value of index higher than said highest value and different from said value, and authenticates the protection device if the response to the challenge is valid, by means of a cryptographic function or a onetime password.

5. A method according to claim 4, whereby said another value is the next integer superior to said value.

6. A method according to claim 4, whereby the communication device and the protection device share a symmetric or asymmetric cryptographic key or share a secret that is composed of a sequence of passwords or numbers and a counter.

7. A method according to claim 1, whereby the protection device is dedicated to one or several type of accessory devices, allowing only said one or several type of accessory devices to communicate with the communication device.

8. A method for ensuring a universal serial bus, USB, attack protection between a communication device and an accessory device, a protection device being inserted between the communication device and the accessory device through a USB link, the method comprising the following steps in the protection device:
    memorizing a highest value of indexes of string descriptor found in a USB Device Descriptor received from the accessory device,
    receiving a request for a string descriptor with a value of index higher than said highest value, the request being sent from the communication device, and
    generating and sending a response to the communication device, the response containing an identifier of the protection device, the identifier being used by the communication device for validating a presence of the protection device in response to the identifier being found in a database.

9. A communication device for ensuring a universal serial bus, USB, attack protection between a communication device and an accessory device, a protection device being inserted between the communication device and the accessory device through a USB link, the communication device comprising:
- at least one processor, and
- at least one memory including computer program code;
- the at least one memory and the computer program code configured to, with the at least one processor, cause the communication device to preform;
- memorizing a highest value of indexes of string descriptor found in a USB Device Descriptor received from the accessory device,
- sending a request for a string descriptor to the accessory device with a value of index higher than said highest value,
- receiving a response generated and sent from the protection device, the response containing an identifier of the protection device, and
- validating a presence of the protection device in response to the identifier being found in a database.

10. A protection device for ensuring a universal serial bus, USB, attack protection between a communication device and an accessory device, the protection device being inserted between the communication device and the accessory device through a USB link and comprising:
- at least one processor, and
- at least one memory including computer program code;
- the at least one memory and the computer program code configured to, with the at least one processor, cause the protection device to preform;
- memorizing a highest value of indexes of string descriptor found in a USB Device Descriptor received from the accessory device,
- receiving a request for a string descriptor with a value of index higher than said highest value, the request being sent from the communication device, and
- generating and sending a response to the communication device, the response containing an identifier of the protection device, the identifier being used by the communication device for validating a presence of the protection device in response to the identifier being found in a database.

11. A non-transitory computer readable medium storing program instructions that, when executed by at least one processor, cause a communication device to preform a method for ensuring a universal serial bus, USB, attack protection between a communication device and an accessory device, a protection device being inserted between the communication device and the accessory device through a USB link, said method comprising:
- memorizing a highest value of indexes of string descriptor found in a USB Device Descriptor received from the accessory device,
- sending a request for a string descriptor to the accessory device with a value of index higher than said highest value,
- receiving a response generated and sent from the protection device, the response containing an identifier of the protection device, and
- validating a presence of the protection device in response to the identifier being found in a database.

12. A non transitory computer readable medium storing program instructions that when executed by at least one processor, cuase a protection device to preform a method for ensuring a universal serial bus, USB, attack protection between a communication device and an accessory device, the protection device being inserted between the communication device and the accessory device through a USB link, said method comprising:
- memorizing a highest value of indexes of string descriptor found in a USB Device Descriptor received from the accessory device,
- receiving a request for a string descriptor with a value of index higher than said highest value, the request being sent from the communication device, and
- generating and sending a response to the communication device, the response containing an identifier of the protection device, the identifier being used by the communication device for validating a presence of the protection device in response to the identifier being found in a database.

* * * * *